US012236247B2

(12) United States Patent
Kurabayashi et al.

(10) Patent No.: US 12,236,247 B2
(45) Date of Patent: Feb. 25, 2025

(54) PROGRAM GENERATION APPARATUS, PROGRAM GENERATION METHOD AND PROGRAM

(71) Applicant: NIPPON TELEGRAPH AND TELEPHONE CORPORATION, Tokyo (JP)

(72) Inventors: Toshiyuki Kurabayashi, Tokyo (JP); Hiroyuki Kirinuki, Tokyo (JP); Yu Yoshimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 69 days.

(21) Appl. No.: 17/798,853

(22) PCT Filed: Feb. 12, 2020

(86) PCT No.: PCT/JP2020/005386
§ 371 (c)(1),
(2) Date: Aug. 10, 2022

(87) PCT Pub. No.: WO2021/161427
PCT Pub. Date: Aug. 19, 2021

(65) Prior Publication Data
US 2023/0086862 A1 Mar. 23, 2023

(51) Int. Cl.
*G06F 8/30* (2018.01)
*G06F 9/44* (2018.01)

(52) U.S. Cl.
CPC . *G06F 9/44* (2013.01); *G06F 8/30* (2013.01)

(58) Field of Classification Search
CPC .. G06F 8/30; G06F 8/443; G06F 8/44; G06N 5/013
See application file for complete search history.

(56) References Cited

U.S. PATENT DOCUMENTS

| | | | |
|---|---|---|---|
| 10,705,810 B2* | 7/2020 | Fuchs | G06F 11/3692 |
| 2017/0168780 A1* | 6/2017 | Tateishi | G06F 8/441 |
| 2019/0171422 A1* | 6/2019 | Udupa | G06F 8/10 |
| 2020/0097261 A1* | 3/2020 | Smith | G06F 8/33 |

OTHER PUBLICATIONS

Balog et al. (2017) "DeepCoder: Learning to Write Programs" arXiv, Mar. 8, 2017 [online] website: https://www.microsoft.com/en-us/research/publication/deepcoder-learning-write-programs/.
Sumit Gulwani (2011) "Automating String Processing in Spreadsheets Using Input-Output Examples" POPL '11 Proceedings of the 38th annual ACM SIGPLAN-SIGACT symposium on Principles of programming languages, Jan. 26, 2011 [online] website: https://dl.acm.org/citation.cfm?id=1926423.

* cited by examiner

*Primary Examiner* — Hanh Thi-Minh Bui

(57) ABSTRACT

The possibility of a desired program being automatically generated is increased by a program generation device including: a generation unit configured to generate a first program that satisfies at least one pair of an input value and an output value; and a determination unit configured to randomly generate an input value that satisfies a constraint regarding input and output of the first program, and determine whether or not an output value that is obtained by inputting the input value to the first program satisfies the constraint.

15 Claims, 7 Drawing Sheets

PROGRAM GENERATION APPARATUS, PROGRAM GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/005386, filed on 12 Feb. 2020, the disclosure of which is hereby incorporated herein by reference in its entirety.

TECHNICAL FIELD

The present invention relates to a program generation device, a program generation method, and a program.

BACKGROUND ART

In recent years, application of IT is increasing throughout the society and insufficiency of IT human resources is a big issue. According to a calculation made by the Ministry of Economy, Trade and Industry, it is estimated that there will be a lack of about 360,000 IT human resources in 2025. In particular, the shortage of IT human resources in implementation processes for which expertise is required is an urgent issue, and there are demands for research and development of automatic programing technologies for automatically carrying out programing.

As a conventional automatic programing technology, there is a technology for compositing components of a program so as to satisfy input-output examples of the program that are given by a user.

For example, NPL 1 discloses a technology for realizing efficient program synthesis by learning a relationship between input-output examples and program components, estimating a program component that has a high probability of being used for a given input-output example, and using the component for synthesis of a program.

Also, NPL 2 discloses a technology for automatically synthesizing an Excel (registered trademark) function from input-output examples of Excel (registered trademark) so as to satisfy the input-output examples.

CITATION LIST

Non Patent Literature

[NPL 1] Matej Balog, Alexander L. Gaunt, Marc Brockschmidt, Sebastian Nowozin, Daniel Tarlow, "DeepCoder: Learning to Write Programs" Proceedings of ICLR'17, [online], Internet <URL:https://www.microsoft.com/en-us/research/publication/deep coder-learning-write-programs/>

[NPL 2] Sumit Gulwani, "Automating String Processing in Spreadsheets Using Input-Output Examples" POPL '11 Proceedings of the 38th annual ACM SIGPLAN-SIGACT symposium on Principles of programming languages Pages 317-330, [online], Internet <URL:https://dl.acm.org/citation.cfm?id=1926423>

SUMMARY OF THE INVENTION

Technical Problem

However, input-output examples are merely examples of a specification satisfied by the program, and there is a shortcoming in that the amount of information is small. Therefore, there is a problem in that there are cases where a program that is overfitted to the input-output examples is generated and the program desired by the user is not generated.

The present invention was made in view of the foregoing, and has an object of increasing the possibility of the desired program being automatically generated.

Means for Solving the Problem

In order to solve the problem described above, a program generation device includes: a generation unit configured to generate a first program that satisfies at least one pair of an input value and an output value; and a determination unit configured to randomly generate an input value that satisfies a constraint regarding input and output of the first program, and determine whether or not an output value that is obtained by inputting the input value to the first program satisfies the constraint.

Effects of the Invention

The possibility of the desired program being automatically generated can be increased.

DESCRIPTION OF EMBODIMENTS

Figure 1:
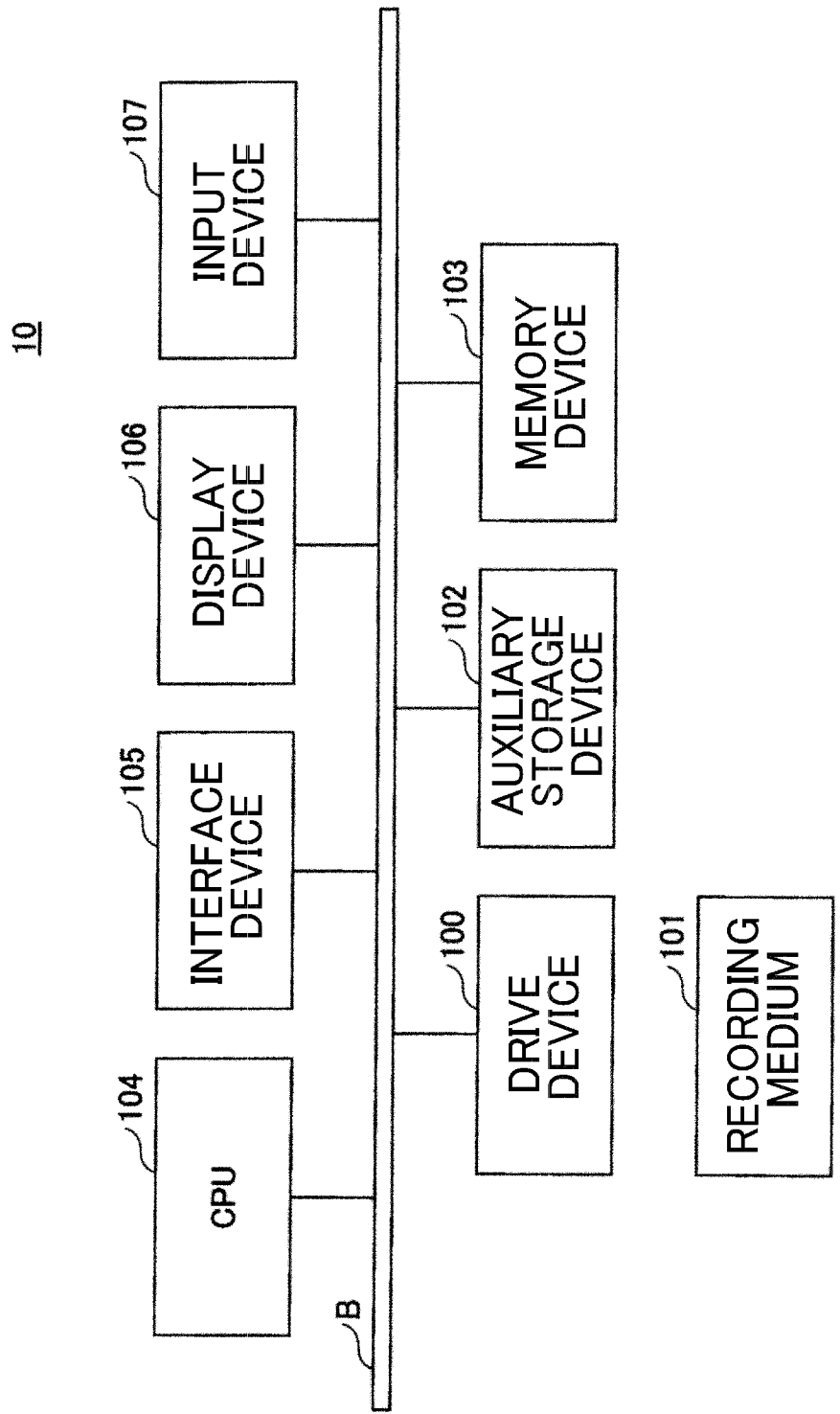
FIG. 1 is a diagram showing an example of a hardware configuration of a program generation device 10 in an embodiment of the present invention.

The following describes an embodiment of the present invention based on the drawings. FIG. 1 is a diagram showing an example of a hardware configuration of a program generation device 10 in the embodiment of the present invention. The program generation device 10 shown in FIG. 1 includes a drive device 100, an auxiliary storage device 102, a memory device 103, a CPU 104, an interface device 105, a display device 106, an input device 107, and the like, which are connected to each other via a bus B.

A program that realizes processing performed in the program generation device 10 is provided using a recording medium 101 such as a CD-ROM. When the recording medium 101 on which the program is stored is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores therein the installed program and necessary files, data, and the like.

When a program start instruction is given, the memory device 103 reads the program from the auxiliary storage device 102 and stores the program in the memory device 103. The CPU 104 realizes functions relating to the program generation device 10 in accordance with the program stored in the memory device 103. The interface device 105 is used as an interface for connection to a network. The display device 106 displays GUI (Graphical User Interface) or the like of the program. The input device 107 is constituted by a keyboard and a mouse, for example, and is used to input various operation instructions.

Figure 2:
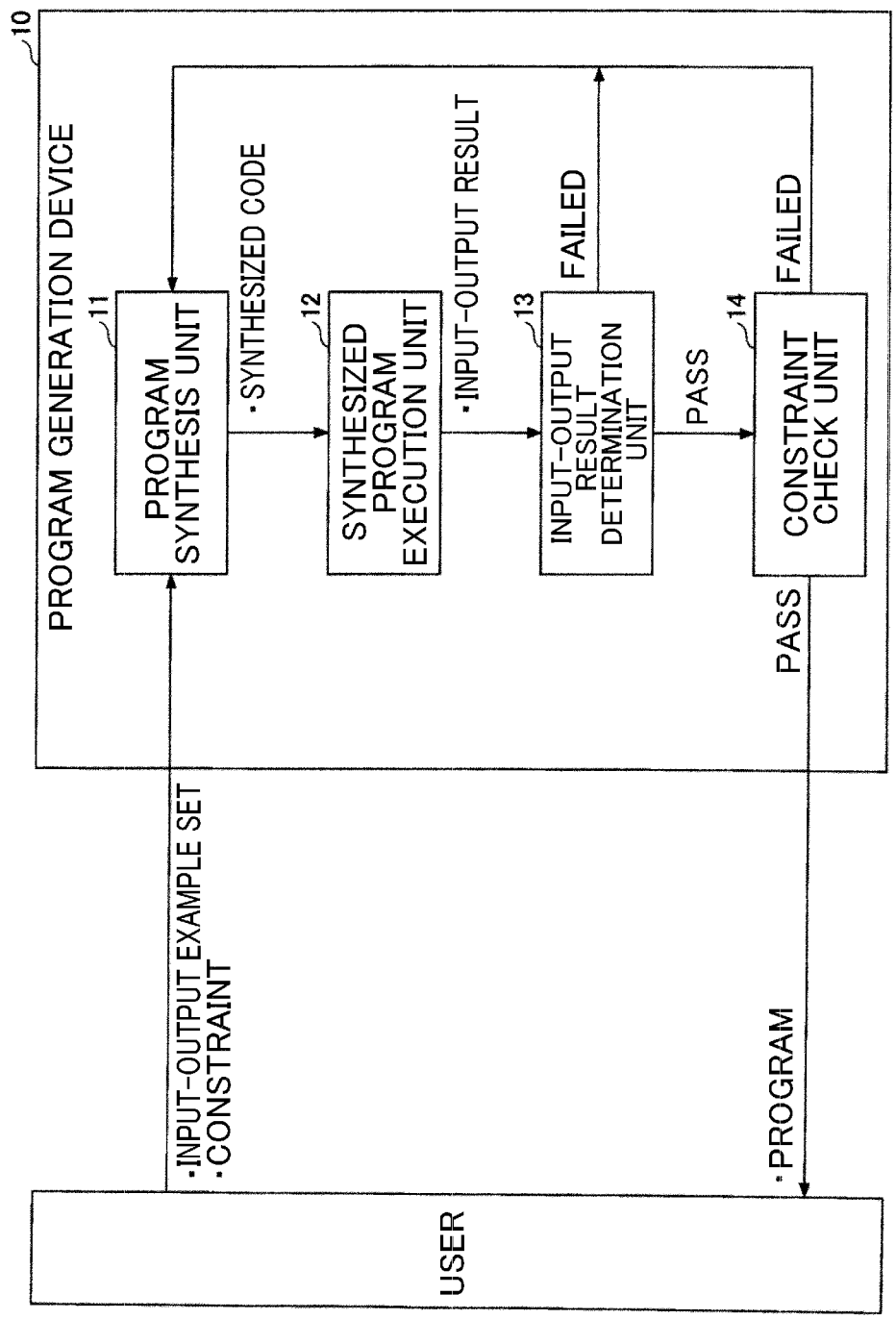
FIG. 2 is a diagram showing an example of a functional configuration of the program generation device 10 in an embodiment of the present invention.

FIG. 2 is a diagram showing an example of a functional configuration of the program generation device 10 in the embodiment of the present invention. The program generation device 10 shown in FIG. 2 includes a program synthesis unit 11, a synthesized program execution unit 12, an input-output result determination unit 13, and a constraint check unit 14. These units are realized through processing that one or more programs installed in the program generation device 10 cause the CPU 104 to execute.

Figure 3:
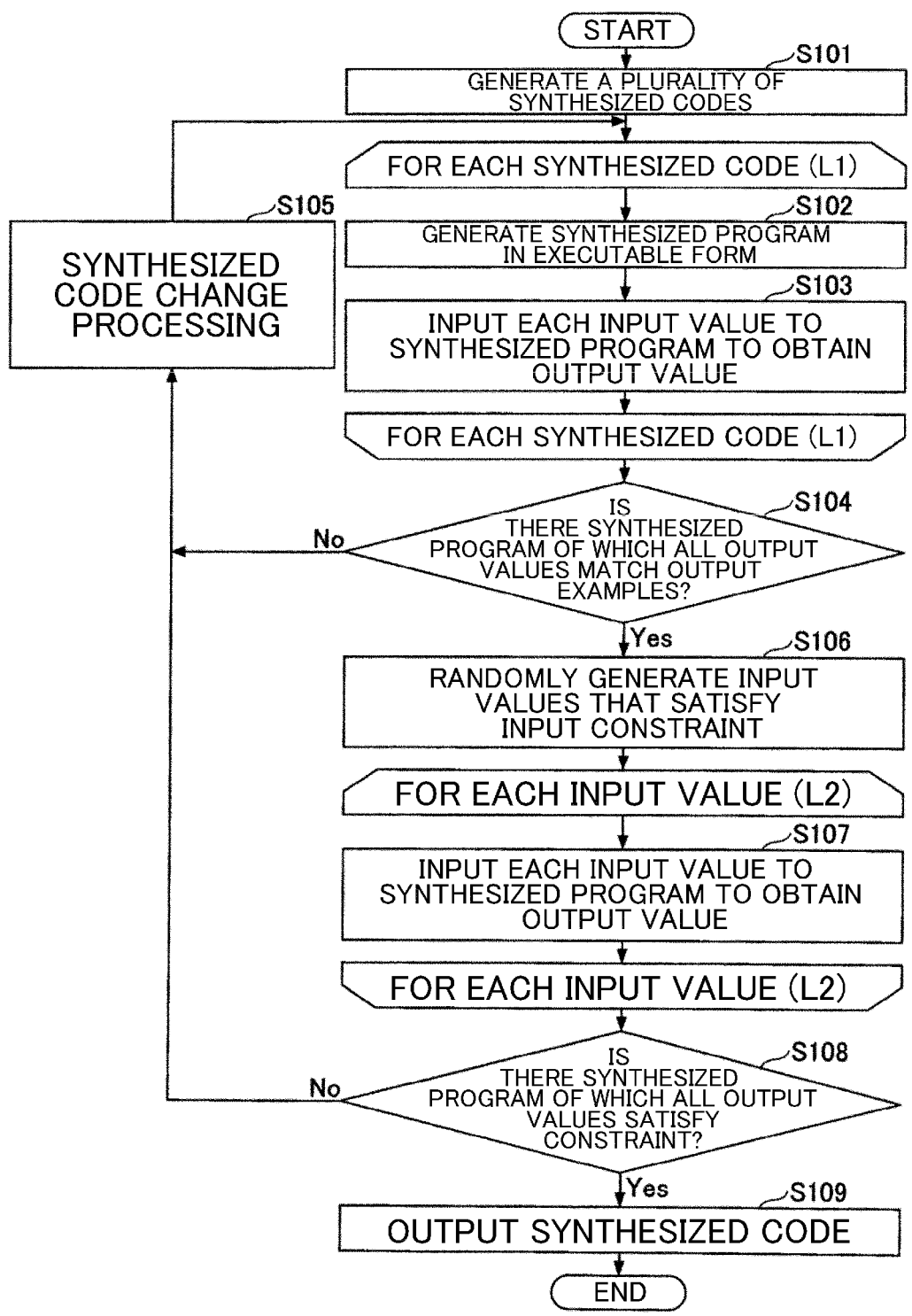
FIG. 3 is a flowchart showing an example of a processing procedure executed by the program generation device 10.

The following describes a processing procedure that is executed by the program generation device 10. FIG. 3 is a flowchart showing an example of the processing procedure executed by the program generation device 10.

In step S101, the program synthesis unit 11 generates source codes (hereinafter referred to as "synthesized codes") of a plurality of (N) programs by, for example, randomly combining and compositing one or more program components included in a program component list that is stored in the auxiliary storage device 102, for example.

Figure 4:
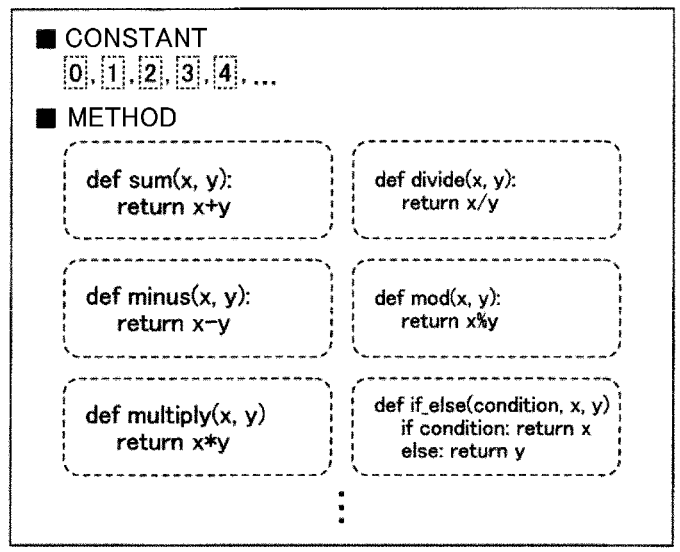
FIG. 4 is a diagram showing an example of a program component list.

FIG. 4 is a diagram showing an example of the program component list. The following is the data structure of the program component list shown in FIG. 4, which is written in a form that is based on the BNF (Backus-Naur form) notation.

<program component list>::=program component+

That is, the program component list includes one or more program components (source codes of the program components). In FIG. 4, the program components are categorized into constants and methods. Here, a single constant corresponds to a single program component, and a single method corresponds to a single program component. That is, each unit surrounded by a dashed line in FIG. 4 corresponds to a unit of a single program component.

In step S101, processing for generating a single synthesized code by selecting a plurality of program components at random and compositing the plurality of program components is repeated N times. As a result, N synthesized codes are generated. It should be noted that compositing program components means combining calculations of the plurality of program components, and can be performed using a known technology such as the technology described in NPL 1, for example. For example, each program component can be expressed using a tree structure in which an operator serves as a parent node and a variable, a constant, or an operator for which an operation is performed using the operator serves as a child node, and a node in the tree structure of a program component can be replaced with the tree structure of another program component to composite these program components. It should be noted that similarly to the program components, a synthesized code includes a definition of taking a value as input, executing a calculation relating to the input value, and outputting a calculation result of the value.

Subsequently, loop processing L1 that includes steps S102 and S103 is executed for each synthesized code. In the following description, a synthesized code for which the loop processing L1 is performed will be referred to as a "target code".

In step S102, the synthesized program execution unit 12 generates a program (hereinafter referred to as a "synthesized program") in an executable form by performing compiling, linking, and the like on the target code.

Subsequently, the synthesized program execution unit 12 executes the synthesized program (hereinafter referred to as the "target synthesized program") by inputting each input-output example included in an input-output example set that is prepared in advance, to the target synthesized program, and obtains output for each input-output example (step S103). The input-output example set is information that indicates conditions to be satisfied by the program to be generated (hereinafter referred to as the "target program") with respect to input and output, and is set in advance and stored in the auxiliary storage device 102, for example.

Figure 5:
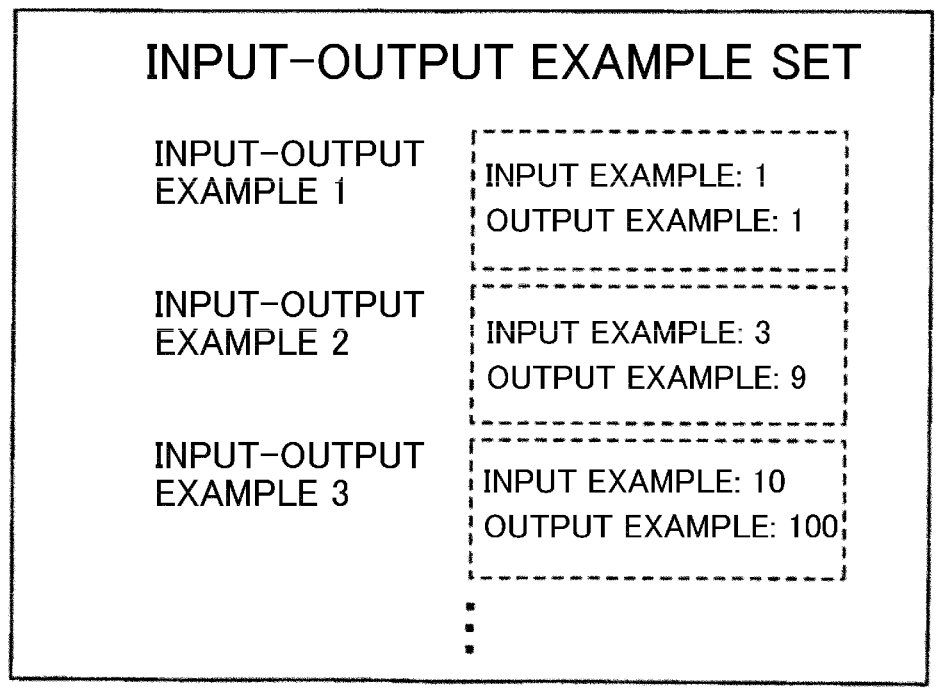
FIG. 5 is a diagram showing an example of an input-output example set.

FIG. 5 is a diagram showing an example of the input-output example set. The following is the data structure of the input-output example set shown in FIG. 5, which is written in a form that is based on the BNF notation.

<input-output example set>::=<input-output example>+
<input-output example>::=<input example><output example>
<input example>::=input value+
<output example>::=output value+

That is, the input-output example set includes one or more input-out examples. Each input-output example is a pair of an input example and an output example. The input example is one or more input values, and the output example is one or more output values.

For example, in a case where the input-output example set includes M input-output examples, in step S103, the synthesized program execution unit 12 executes the target synthesized program for each of M input values by inputting the input values, and obtains M output values.

When the loop processing L1 has ended, the input-output result determination unit 13 determines whether there is a synthesized program for which all output values match output examples of input-output examples to which input values corresponding to the output values belong (step S104). That is, it is determined whether there is a synthesized program for which all output values obtained in step S103 were as expected (correct), among synthesized programs for which the loop processing L1 has been performed.

If there is no synthesized program that satisfies the condition of step S104 (No in step S104), the program synthesis unit 11 executes synthesized code change processing (step S105). In the synthesized code change processing, a plurality of (N) synthesized codes are generated by partially changing the original synthesized code. For example, a genetic algorithm may be used to partially change the synthesized code. That is, a genetic operation may be performed N times on the synthesized code of the previous generation to generate N synthesized codes of the next generation. Here, N represents the number of individuals (source codes) of a single generation of the genetic algorithm. At this time, each synthesized code to which the genetic algorithm is applied is expressed using a tree structure in which an operator serves as a parent node and a variable, a constant, or an operator for which an operation is performed using the operator serves as a child node, for example, and the genetic operation is performed on a subtree of the tree structure. A pass rate of output values (a rate at which the output values were correct) may be used in evaluation for selecting individuals on which the genetic operation is performed N times.

For example, program components included in the program component list are used as candidates that replace a portion of the synthesized code of the previous generation in mutations.

Figure 6:
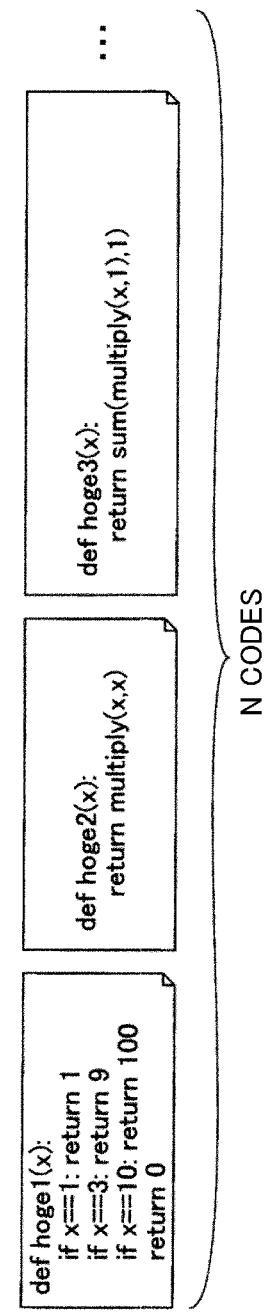
FIG. 6 is a diagram showing an example of synthesized codes that are generated through synthesized code change processing.

FIG. 6 is a diagram showing an example of synthesized codes that are generated through the synthesized code change processing. As shown in FIG. 6, N synthesized codes are generated as a result of synthesis processing being performed once.

It should be noted that an existing library such as DEAP (https://deap.readthedocs.io/en/master/) may be used for program synthesis processing in which the genetic algorithm is used.

Subsequently, the loop processing L1 and the following processing are executed for the N synthesized codes. Accordingly, in this case, steps S102 and S103 are executed N times.

On the other hand, if there is at least one synthesized program (hereinafter referred to as an "input-output pass program") that satisfies the condition of step S104 (Yes in step S104), the loop processing L1 ends and the procedure proceeds to step S106. That is, in the loop processing L1, an input-output pass program that satisfies the input-output example set is automatically generated as a result of a partial change of the synthesized code being repeated (the synthesized code being cumulatively changed portion by portion) until a program that satisfies the input-output examples generated in advance is generated. For example, in a case where the three input-output examples shown in FIG. 5 are all of the input-output examples constituting the input-output example set, the first and second synthesized codes from the left in FIG. 6 are input-output pass programs.

In step S106, the constraint check unit 14 generates one or more input values at random for the input-output pass program within the range of an input constraint that is one of constitutional elements of a constraint (constraint condition) that is input by the user with respect to input and output of the target program. That is, one or more input values that satisfy the input constraint are generated. It is preferable that many input values are generated to increase the accuracy of determining that the input-output pass program satisfies the constraint.

Figure 7:
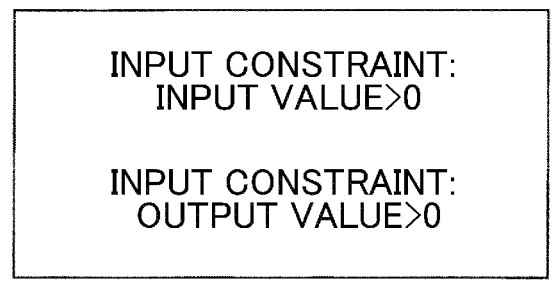
FIG. 7 is a diagram showing an example of a constraint.

FIG. 7 is a diagram showing an example of the constraint. The following is the data structure of the constraint shown in FIG. 7, which is written in a form that is based on the BNF notation. <constraint>::=input constraint output constraint That is, the constraint is a pair of a single input constraint and a single output constraint. However, the single input constraint or the single output constraint may be constituted by a plurality of conditional expressions.

When the input constraint is as shown in FIG. 7, in step S106, a plurality of input values greater than 0 are generated at random.

Subsequently, the constraint check unit 14 executes loop processing L2 that includes step S107 for each of the input values generated in step S106. In the following description, an input value for which the processing is performed will be referred to as a "target input value".

In step S107, the constraint check unit 14 executes the input-output pass program by inputting the target input value to the input-output pass program, and obtains an output value. In a case where there are a plurality of input-output pass programs, an output value for the same input value is acquired with respect to each of the input-output pass programs. The acquired output values are recorded in the memory device 103 in association with the respective input-output pass programs.

In a case where K input values are generated in step S106, step S107 is executed for the K input values.

When the loop processing L2 has ended, the constraint check unit 14 determines whether there is an input-output pass program for which all output values (all of K output values) satisfy the output constraint (whether or not all output values of any of the input-output pass programs satisfy the output constraint) (step S108). If there is no input-output pass program that satisfies the condition of step S108 (No in step S108), the processing performed in step S105 and the following processing are repeated. That is, synthesized programs that differ from the previous ones are generated, and the loop processing L1 and the following processing are executed for the synthesized programs.

If there is an input-output pass program that satisfies the condition of step S108 (Yes in step S108), the constraint check unit 14 outputs the source code (synthesized code) of the input-output pass program (step S109). That is, the synthesized program is determined to be the target program. If there are a plurality of input-output pass programs that satisfy the condition of step S108, source codes of the respective input-output pass programs can be output.

For example, in a case where input values generated in step S107 are the following three values {1,2,98}, output values of an input-output pass program that is based on the leftmost synthesized code shown in FIG. 6 are {1,0,0}, and some of the output values do not satisfy the output constraint. On the other hand, output values of an input-output pass program that is based on the second synthesized code from the left in FIG. 6 are {1,4,9604}, and all of the output values satisfy the output constraint. Accordingly, in this case, the input-output pass program based on the second synthesized code from the left in FIG. 6 is determined to be the target program.

As described above, according to the present embodiment, a program that satisfies not only input-output examples but also constraints regarding input and output is automatically generated. Accordingly, the possibility of the desired program being automatically generated can be increased. Specifically, not only validity of each synthesized program obtained by compositing program components is checked using input-output examples, but also input values are automatically generated at random within the range of a given input constraint and are input to each synthesized program to determine whether all synthesized programs satisfy the constraint regarding output, and therefore, inappropriate programs can be excluded.

For example, assume that the desired program is a program for finding the area of a square. Assume that the user has given an input value 2 and an output value 4 as an input-output example. In this case, a program "x*x" has to be output, but the input-output example is also satisfied by a program "6−x", and this program may be output as a program that satisfies the input-output example. In the case of this example, both input and output need to be always positive (there are neither negative lengths nor negative areas). Accordingly, the user inputs a constraint regarding input and output such as {input x>0, output y>0}, and the validity of each synthesized program is determined using not only the input-output example but also the constraint. Specifically, various values are generated at random within the range of x>0, each synthesized program is executed using the values, and it is determined whether or not the output value y always satisfies y>0. In the case of the program "6-x", for example, y=-2 when x=8, which does not satisfy the constraint, and therefore, the program is determined to be inappropriate.

In the present embodiment, the program synthesis unit 11 is an example of a generation unit. The constraint check unit 14 is an example of a determination unit.

Although an embodiment of the present invention has been described in detail, the present invention is not limited to the specific embodiment, and various alterations and changes can be made within the scope of the gist of the present invention described in the claims.

REFERENCE SIGNS LIST

10 Program generation device
11 Program synthesis unit
12 Synthesized program execution unit
13 Input-output result determination unit
14 Constraint check unit
100 Drive device
101 Recording medium
102 Auxiliary storage device
103 Memory device
104 CPU
105 Interface device
106 Display device
107 Input device
B Bus

The invention claimed is:

1. A program generation device comprising a processor configured to execute a method comprising:
generating a first program that satisfies at least one pair of an input value and an output value;
generating, at random, a target input value that satisfies a constraint regarding input and output of the first program;
determining whether a first test output value that is obtained by inputting the target input value to the first program satisfies the constraint including the first test output value associated with the target input value;
outputting a first code of the first program; and
causing execution of the first code of the first program, wherein, when the determining indicates that the constraint is not satisfied:
generating a second program that is distinct from the first program by replacing at least a part of the first code of the first program by a second code according to a mutation of the first program based on a genetic algorithm, and
generating a second test output value of the second program based on the target input value, wherein the second test output value satisfies the constraint according to a pair of the target input value and the second test output value;
determining, with respect to the second program, whether or not the constraint is satisfied;
outputting, based on the determining whether the constraint is satisfied by the second program, a second program code associated with the second program; and
causing execution of the second program code associated with the second program.

2. The program generation device according to claim 1, wherein the constraint further includes at least one of the target input value being a first positive value or the first test output value being a second positive value.

3. The program generation device according to claim 1, wherein the first program is based on synthesizing a combination of program components stored in a storage.

4. The program generation device according to claim 1, wherein the generating the second program further comprises modifying the first code of the first program based on generating a modified code using the genetic algorithm.

5. The program generation device according to claim 1, wherein the generating the second program further comprises replacing at least a part of the first code of the first program with a program component stored in a storage according to the mutation of the first program based on the genetic algorithm.

6. A computer implemented method for generating a program including a code, comprising:
generating, by a computer, a first program that satisfies at least one pair of an input value and an output value;
determining, at random, a target input value that satisfies a constraint regarding input and output of the first program;
determining whether a first test output value that is obtained by inputting the target input value to the first program satisfies the constraint including the first test output value associated with the target input value;
outputting, based on the determination whether the first test output value satisfies the constraint, a first code of the first program; and
causing execution of the first code of the first program, wherein, when the determining indicates that the constraint is not satisfied:
generating a second program that is distinct from the first program by replacing at least a part of the first code of the first program by a second code according to a mutation of the first program based on a genetic algorithm, and
generating a second test output value based on the target input value, wherein the second test output value of the second program satisfies the constraint according to a pair of the target input value and the second test output value;
determining whether the constraint is satisfied is determined with respect to the second program;
outputting, based on the determining whether the constraint is satisfied by the second program, a second program code associated with the second program; and
causing execution of the second program code associated with the second program.

7. The computer implemented method according to claim 6, wherein the constraint further includes at least one of the target input value being a first positive value or the first test output value being a second positive value.

8. The computer implemented method according to claim 6, the first program is based on synthesizing a combination of program components stored in a storage.

9. The computer implemented method according to claim 6, wherein the generating the second program further comprises modifying the first code of the first program based on generating a modified code using the genetic algorithm.

10. The computer implemented method according to claim 6, wherein the generating the second program further comprises replacing at least a part of the first code of the first program with a program component stored in a storage according to the mutation of the first program based on the genetic algorithm.

11. A computer-readable non-transitory recording medium storing computer-executable program instructions that when executed by a processor cause a computer to execute a program generation method comprising:
- generating, by a computer, a first program that satisfies at least one pair of an input value and an output value;
- determining, at random, a target input value that satisfies a constraint regarding input and output of the first program;
- determining whether a first test output value that is obtained by inputting the target input value to the first program satisfies the constraint including the first test output value associated with the target input value;
- outputting, based on the determination whether the first test output satisfies the constraint, a first code of the first program; and
- causing execution of the first code associated with the first program, wherein, when the determining indicates that the constraint is not satisfied:
  - generating a second program that is distinct from the first program by replacing at least a part of the first code of the first program by a second code according to a mutation of the first program based on a genetic algorithm, and
  - generating a second test output value of the second program based on the target input value, wherein the second test output value satisfies the constraint according to a pair of the target input value and the second test output value;
  - determining whether the constraint is satisfied is determined with respect to the second program;
  - outputting, based on the determining whether the constraint is satisfied by the second program, a second program code associated with the second program; and
  - causing execution of the second program code associated with the second program.

12. The computer-readable non-transitory recording medium according to claim 11, wherein the constraint further includes at least one of the target input value being a first positive value or the first test output value being a second positive value.

13. The computer-readable non-transitory recording medium according to claim 11, wherein the first program is based on synthesizing a combination of program components stored in a storage.

14. The computer-readable non-transitory recording medium according to claim 11, wherein the generating the second program further comprises modifying the first code of the first program based on generating a modified code using the genetic algorithm.

15. The computer-readable non-transitory recording medium according to claim 11, wherein the generating the second program further comprises replacing at least a part of the first code of the first program with a program component stored in a storage according to the mutation of the first program based on the genetic algorithm.

* * * * *